Jan. 12, 1937.    W. D. FINNEY    2,067,523
DISPENSING DEVICE
Filed June 5, 1933

Inventor.
Walter D. Finney.
By Ernest R. Llewellyn.
Attorney.

Patented Jan. 12, 1937

2,067,523

UNITED STATES PATENT OFFICE 2,067,523

DISPENSING DEVICE

Walter D. Finney, Hollywood, Calif.

Application June 5, 1933, Serial No. 674,371

7 Claims. (Cl. 221—114)

This invention relates to a dispensing device and more particularly to a container and dispensing device comprising a complete unit and whereby the element disposed in the container may be dispensed in a predetermined quantity.

In the dispensing of liquids or powder forms, numerous means have been utilized, in the measurement of a predetermined amount, such as the well known graduated measuring glass, and other similar devices, which comprises a separate unit. To the inexperienced, the present forms of measuring devices require, in many instances, the exercise of great care in measuring the desired amount of the element as called for on the package directions, and which are commonly given as one tablespoon, one desertspoon or one teaspoon; and, as is often the case, many users cannot differentiate between a dessertspoon and a teaspoon or other comparative amounts.

Therefore, the object of my present invention is to provide a container, for an element, having a dispensing device associated therewith to form a complete unit, that may be readily packed for shipment, and the unit being adapted to be suitably supported by a wall bracket, or like means, for the convenient dispensing of the element in a predetermined measured quantity.

A further object is the provision of means whereby the volume to be dispensed may be indicated and adjusted to deliver a like amount each time the element is dispensed.

A still further object is the provision of a specially formed container unit which will be limited to use in connection with a specific supporting device.

To accomplish the above objects, I have provided a container, which may be of any desired contour, having, in my preferred form, a substantially conical discharge end with a port opening therein which connects with a measuring chamber formed by the dispensing member. The dispensing member is preferably provided with a substantially conical discharge end having a discharge opening therein, the body portion of the dispensing member being adapted to be adjustably engaged by the body portion of said container and, if desired, may be secured in position by any suitable means such as a seal. I have provided a valve, which is disposed in the measuring chamber which, when actuated to dispense the element contained in said chamber, will retain the port opening of the container in a closed relation and, when the valve is released, will again permit the element to replenish the measuring chamber for a subsequent dispensing of the element.

While in my illustrated preferred form I have shown my container and dispensing member as a unit, it is to be understood that these two members may, if desired, be formed as separate units and according to various requirements. In this preferred form the consumer retains the supporting device and replenishes the container and dispenser properly adjusted as a unit.

In the accompanying drawing I have shown my container and dispensing device, with suitable supporting means, sufficient to enable those skilled in the art to understand the construction and operation thereof.

Referring to the drawing.

Figure 1:
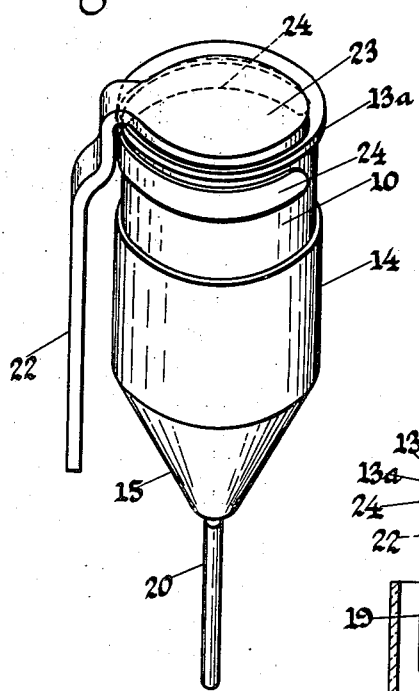
Fig. 1 is a perspective view of my container and dispensing device assembled with my supporting bracket.

In the accompanying drawing my container is provided with a body portion 10 and an integral conical discharge end 11, having a discharge opening 12 formed therein. The opposed end of my container is provided with an end cover 13 and provided with an annular flange or beading 13a. This flange or beading may be an integral portion of the cover 13 or formed when sealing the cover to the container body when it is desired to utilize this end in filling the container.

The dispensing member, which is preferably formed of a transparent material, is provided with a body portion 14 of like contour and adapted to engage the body portion 10 of the container in close relation. Said dispensing member is provided with a conical discharge end 15 having a discharge opening 16 formed therein, the side walls of said conical end 15 forming a measuring chamber 17 adjacent the conical end 11 of the container.

The chamber 17 has contained therein a valve body 18 having opposed guide stems 19, 20, which project respectively through the discharge openings 12, 16.

Figure 2:
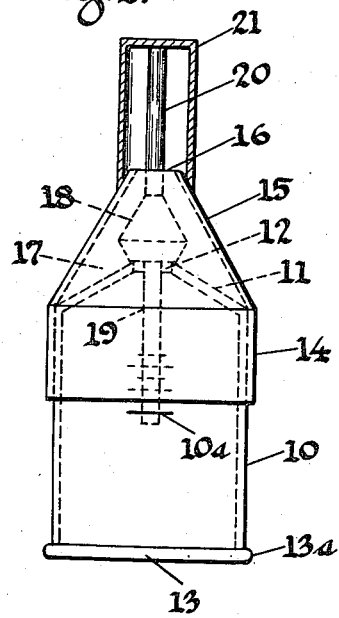
Fig. 2 is a side elevation of my container and dispensing unit shown with a sealing cap, in section, ready for shipment.

At Fig. 2, I have shown my unit prepared for shipment with the cap 21 engaging the stem 20 to retain the valve body 18 in its sealed position against the opening 12 of the container. The cap 21 may be sealed or otherwise secured to the dispensing member discharge end 15.

At Fig. 1, I have shown my unit assembled with one form of supporting device which comprises a bracket 22, adapted to be secured to a wall. The bracket 22 is provided with a laterally extending cover 23 which engages one end of the container to prevent upward movement of said container upon the valve 18 being actuated as will be hereinafter described.

The bracket 22 is provided with oppositely disposed spring arms 24 adapted to engage and hold the body portion 10 of the container, and the projecting annular flange or beading 13a will engage the spring arms to prevent downward movement of the unit.

Figure 5:
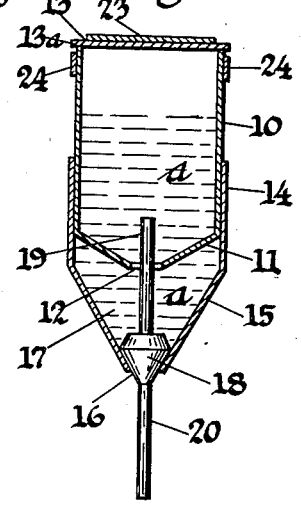
Fig. 5 is a view corresponding substantially to Fig. 3, but shows the container in an adjusted position relative to the dispensing member.

At Fig. 5, the unit is shown in its normal closed position with a measured amount of the element discharged from the container into the measuring chamber 17 and ready to be dispensed.

Figure 4:
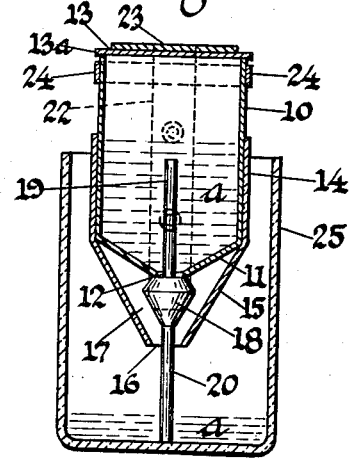
Fig. 4 is a view corresponding to Fig. 3, but shows the valve in its open position relative to the measuring chamber.
Figure 3:
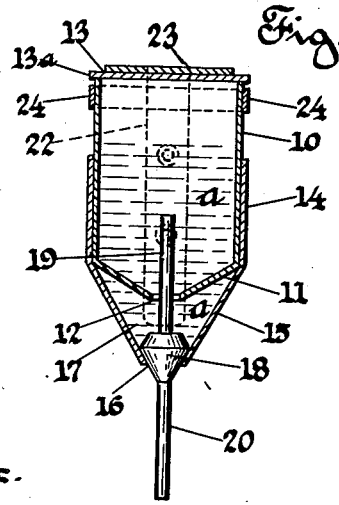
Fig. 3 is a sectional elevation of my container and dispensing device showing the valve in its normal closed position.

At Fig. 4, a receptacle 25 has engaged the stem 20 and lifted the valve 18 into engagement with the opening 12 thus preventing the element a in the container from being discharged into the measuring chamber while the element previously contained in the measuring chamber 17 is permitted to discharge through the opening 16 into the receptacle or other device. When the receptacle 25 is disengaged with the stem 20 the valve 18 will automatically drop into its engaging position to close the discharge opening 16 and open the communicating opening between the chamber 17 and the container thus permitting the element to again fill the measuring chamber 17 for subsequent dispensing.

My container is provided with graduation marks 10a by which the dispensing member may be positioned relative to the body portion 10 and thereby the capacity of the chamber 17 may be varied to dispense a desired volume, and when essential the dispensing member may be secured, in any suitable manner, to the container body thus assuring that a stipulated amount will be dispensed upon each actuation of the valve.

Having thus described my invention it will be evident that many changes and modifications may be made therein, by those skilled in the art, without departing from the spirit and scope thereof; therefore, I do not wish to be limited to the specific details herein disclosed, but what I claim is:—

1. A device within which comminuted materials may be packed for shipment and from which they may be dispensed comprising a container for said materials, said container having walls continuous thereabout except at a single aperture, an element detachably connected with said container and forming therewith a measuring chamber, said chamber having an aperture therein, a valve within said measuring chamber and movable to open and to close alternatively each of said apertures, means projecting from said valve through the aperture in the measuring chamber, and a member removably secured to the said chamber-forming element, said member engaging said projecting means to hold the said valve in position for closing the aperture in the said container, whereby the said comminuted materials are retained within the chamber during shipment and until the said member is removed.

2. A device as set forth in claim 1 in which the walls which contain the apertures in both the container and the element are conical in shape and in which the aperture in each is at the apex of the respective cone-shaped wall.

3. A device as set forth in claim 1 in which the means projecting from the valve through the aperture in the measuring chamber is a pin and in which the member engaging said means is a cap which surrounds the pin and engages its outer end.

4. A device as set forth in claim 1 in which the said element telescopes about the container and is frictionally held in any position of adjustment thereon for varying the capacity of the measuring chamber, and in which a wall of the container is provided with graduation marks showing positions of adjustment of said element for securing the desired capacity of the said chamber.

5. In a device of the character described, a container for comminuted materials having at one of its ends a bottom member closing the container at that end and, at the opposite end, an outwardly tapering wall with an opening at the apex of said wall, an outer member telescoping over the side walls of said container, said outer member having an outwardly tapering wall with an opening at its apex opposite the opening in the container, the said tapering walls forming a measuring chamber for the comminuted materials, a plunger projecting outwardly through the last-mentioned opening and having a valve member thereon adapted to close said openings alternatively as the plunger is reciprocated, whereby measured quantities of the said materials are first received into the chamber and then dispensed therefrom, a bracket, a pair of resilient arms on said bracket adapted to embrace and hold the container in inverted position with the plunger projecting from the opening in the said outer member, and a member on said bracket projecting over the bottom of the inverted container and adapted to hold the latter from endwise movement as the plunger is reciprocated.

6. A device as set forth in claim 5 in which the said bottom member projects beyond the side walls of the container to provide a flange which engages with the said resilient arms of the bracket when the container is supported from the bracket.

7. A device as set forth in claim 5 in which the side walls of the container and the telescoping outer member are cylindrical and the tapered walls are conical and in which the resilient arms on the bracket are circular to fit against the said cylindrical outer walls.

WALTER D. FINNEY.